Feb. 9, 1971   L. L. BURDICK, JR   3,561,865
COPYING APPARATUS

Filed March 9, 1967   5 Sheets-Sheet 1

INVENTOR.
LESTER L. BURDICK, JR.
BY
Kenway, Jenney & Hildreth
ATTORNEYS

Feb. 9, 1971     L. L. BURDICK, JR     3,561,865
COPYING APPARATUS

Filed March 9, 1967     5 Sheets-Sheet 3

INVENTOR.
LESTER L. BURDICK, JR.
BY
Kenway, Jenney & Hildreth
ATTORNEYS

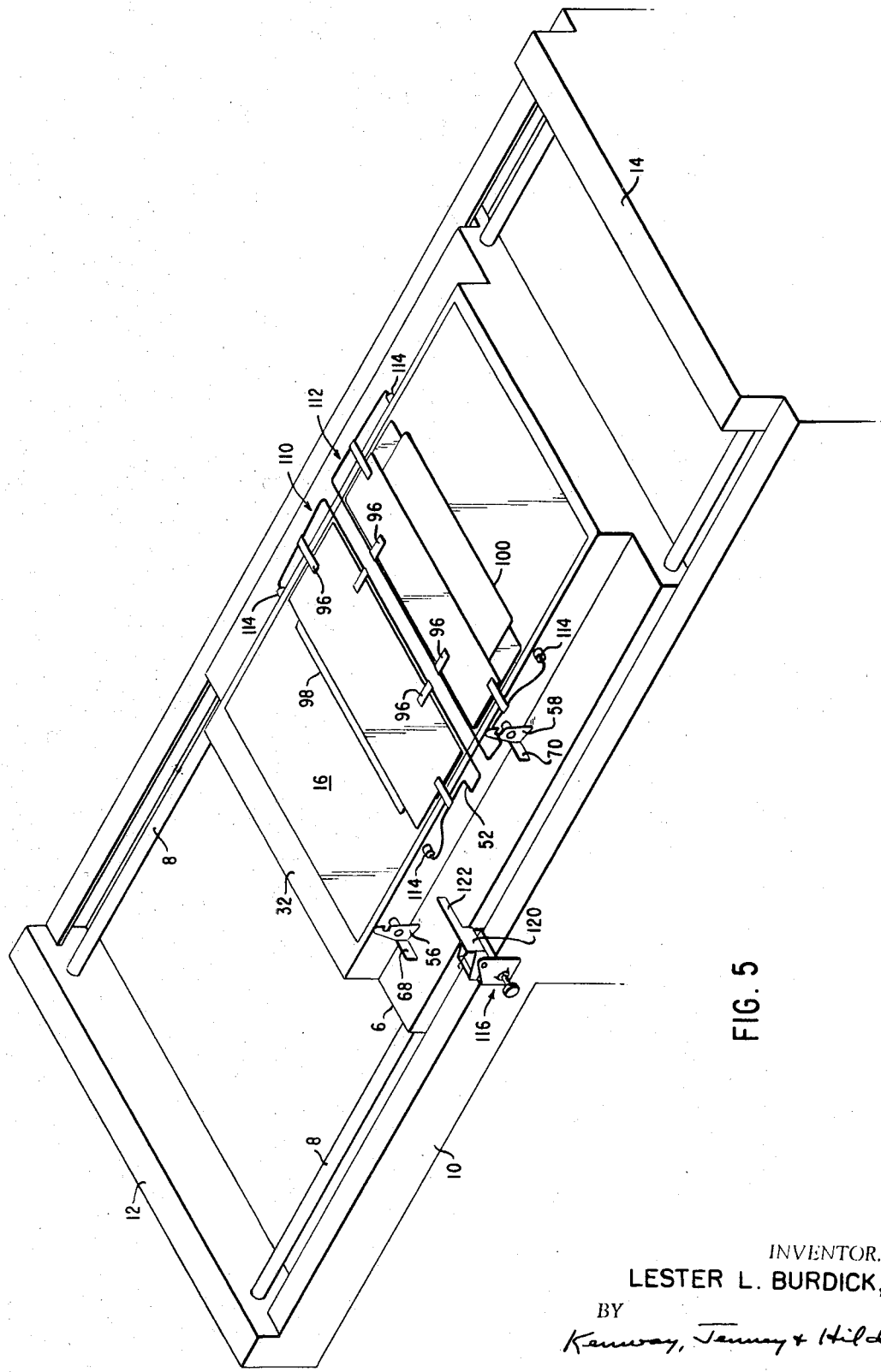

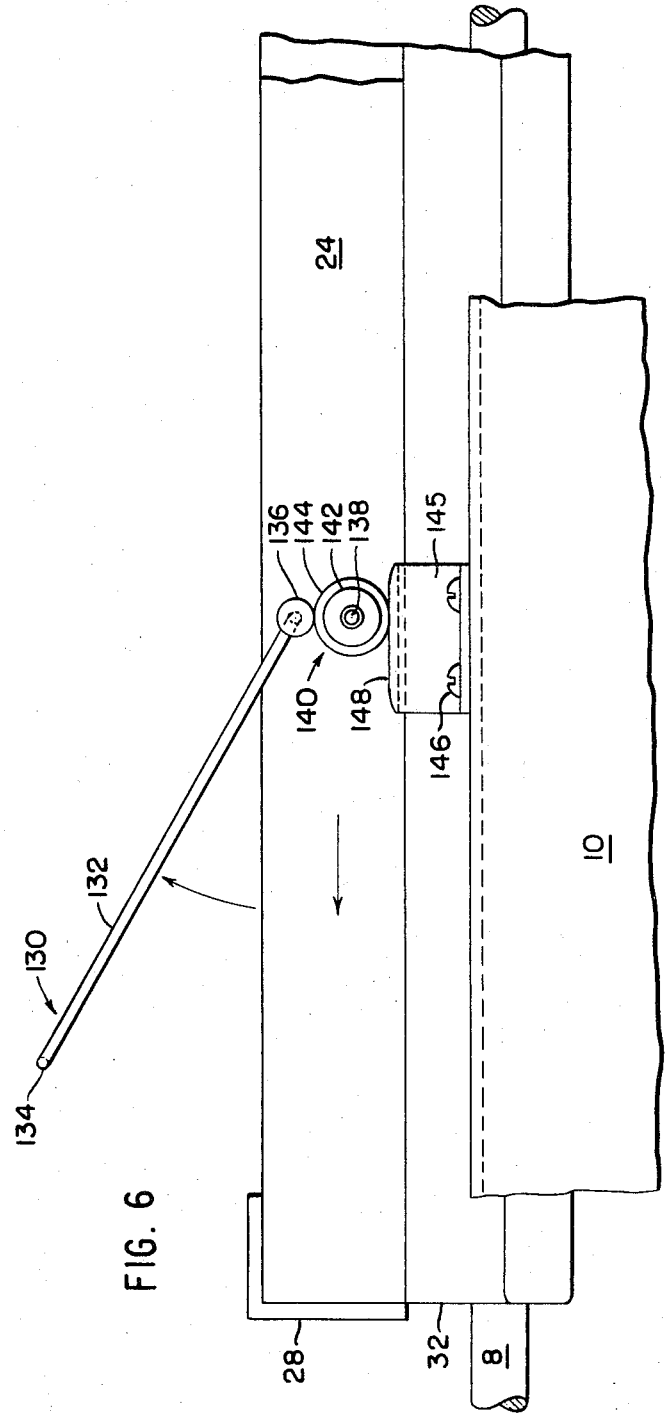

United States Patent Office 3,561,865
Patented Feb. 9, 1971

3,561,865
COPYING APPARATUS
Lester L. Burdick, Jr., Farmers Row,
Groton, Mass. 01450
Filed Mar. 9, 1967, Ser. No. 621,947
Int. Cl. G03b 27/62
U.S. Cl. 355—23                13 Claims

ABSTRACT OF THE DISCLOSURE

The invention is an apparatus which is an improvement over existing copying machines such as the electrostatic type of machine. The apparatus provides a holder for a document for holding it on the platen of a copying machine for copying one surface of the document, and then automatically movable means turn the holder and document over on the platen so that the other side will be copied. Either a single or a plurality of documents may have both sides copied on a single sheet of paper. The holder is pivotally mounted on the copying machine, and is automatically swung to either of two positions with respect to the platen, in one of which one side of the material is copied, and in the other, the other side of the material is copied.

BACKGROUND OF THE INVENTION

This invention lies in the field of copying machines, and particularly in the field of the so-called electrostatic copiers which are in widespread use today. Such copiers may be divided into two general classes, in one of which the material being copied moves through the machine; and in the other class, the material is constantly outside the machine and is generally pressed against a flat transparent platen while the copying takes place. It is this latter type of machine with which this invention is concerned and which is an improvement thereof.

Ordinarily, the copiers of the above described class are such that only one side of a document can be copied on a single sheet of paper. However, in many businesses today, and particularly in view of the growing amount of record keeping required by large corporations, it is necessary to copy on a single sheet of copy paper both sides of small cards such as IBM cards. That is, on such an IBM card there will be information typed or written on both surfaces of the card, and it is desired for one of many reasons to make a permanent copy (on a single sheet of paper) of both sides of such cards. The problem is to do this at least semi-automatically in order to save time.

It is the general purpose of this invention to provide a means whereby either a plurality of small cards may have their front and back surfaces copied on a single sheet of copy paper in a simple manner using apparatus which is automatic; or, a single sheet of paper having a length equal to half of the length of the platen machine, may be automatically copied so that its front and back surfaces show on the same single sheet of copy paper. This copying is done automatically in both cases, except for loading and unloading the material to be copied.

Therefore, among the several objects and provisions of the invention may be noted the following: the provision of a photocopying machine in which means are provided for automatically copying both sides of an original document on a single sheet of copy paper; the provision of an apparatus of the above class in which there is provided means for copying the both sides of a plurality of original documents automatically on a single sheet of copy paper; the provision of apparatus of either of the above classes in which no overlapping of the copy images appears on the sheet of copy; a provision of the apparatus of the aforesaid kinds in which the apparatus is adjustable as to the size of the documents to be copied; the provision of apparatus of any of the aforesaid classes in which means are provided to permit the machine to be used for its normal purpose of copying just one side of a standard size sheet of paper; the provision of apparatus of the above classes which serves as an accessory attachment for existing copying machines, the apparatus being detachable when it is desired to use the copying machine for its regular purposes; a provision of apparatus of any of the above kinds particularly adapted for use in the kind of machine in which there is relative motion between the material being copied and the lens of the machine; apparatus of any of the above classes which is easily and economically made, and simple to maintain and use. Other objects and advantages will be in part obvious and in part pointed out hereinafter.

The invention accordingly comprises the elements and combinations of elements, features of construction, arrangements of parts, and manipulation of the apparatus all of which will be exemplified in the structures hereinafter set forth, and the scope of the application of which will be indicated in the appended claims.

In the accompanying drawings, in which are shown several embodiments of the invention:

FIG. 5 is an illustration of a second embodiment of the invention, showing the parts thereof in a second position of the operation of the apparatus; and FIG. 6 is an elevation of a portion of a third embodiment of the invention, showing the parts thereof in intermediate position.

Throughout the drawings, similar reference numerals indicate corresponding parts. Dimensions and relative dimensions of certain of the parts as shown in the drawings may have been modified and/or exaggerated for purposes of clarity of illustration.

Referring now to FIGS. 1–4, the embodiment illustrated therein is one in which a conventional electrostatic photocopying machine is adapted by means of this invention to realize the objects of this invention as set forth above. The embodiment contemplates as the invention both the combination of attachment and the conventional machine, and also the attachment itself.

Figure 1:
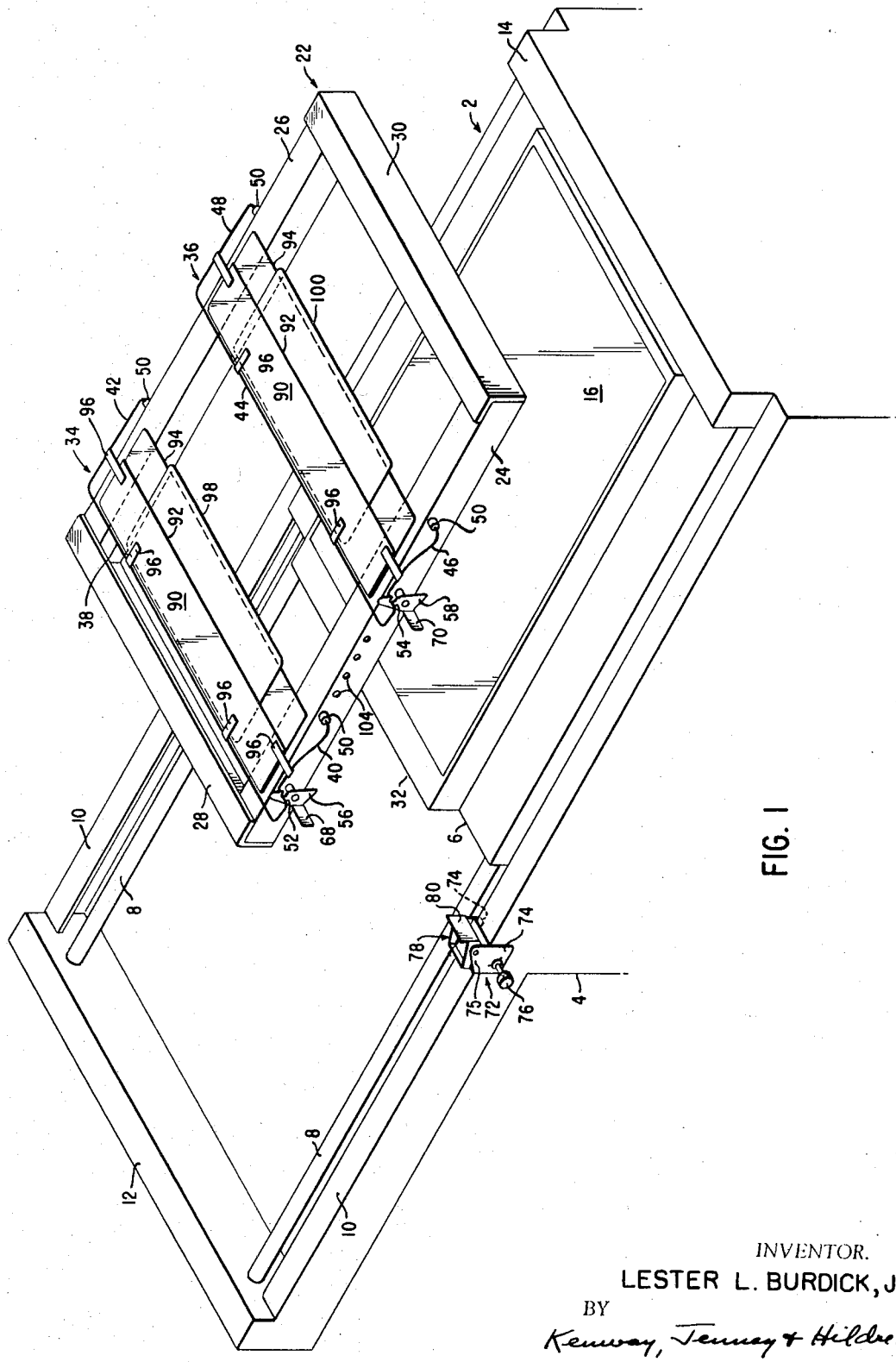
FIG. 1 is one embodiment of the invention with components thereof shown in exploded view for clarity of illustration.

Referring first to FIG. 1, there is shown a conventional photocopying machine indicated generally by numeral 2 which uses an electrostatic process for making copies of documents. In the present case, the machine illustrated is one readily obtainable in the market manufactured by American Photocopy Equipment Company, and called the Apeco Photocopier. In view of the fact that this machine is conventional, and its operation and construction are therefore not a part of this invention, only so much of its construction as will illustrate this invention and its use will be given herein. To this end, therefore, the Apeco machine shown is one having a container 4 in which are housed the required optical system, and all of the other pertinent apparatus necessary to make electrostatic copies. Mounted slidably along the top of container 4 is a movable carriage 6 which slides on the guide rods 8, the latter being suitably supported between the side channels 10, and having their ends fastened in end walls 12 and 14 of the device. The carriage 6 comprises a transparent platen 16 on which is to be laid the material to be copied, the platen being the top surface of a rectangularly shaped, upwardly extending portion 32 of the carriage.

In operation of this machine, the carriage 6 moves from the right-hand position shown in FIG. 1 to a left-hand position near end 12, carrying with it the material to be copied past a light source and a stationary lens which scans said material. The image from this lens is suitably brought to focus on the copy paper within the machine, and thereafter the copies are made in the manner well known to those skilled in the art of such machines and copying processes.

Thus, in this type of copying machine there is a relative motion between the material being copied and the lens of the copying machine. In order to retain clarity of the drawings, purposely the interior construction of the photocopying machine has been omitted.

The apparatus for holding the material to be copied on the platen 16 so that first one side of the material is photocopied, and then the material is turned over so that the other side is positioned for copying, comprises an attachment indicated generally by numeral 22 which comprises a rigid rectangularly-shaped frame having the side members 24 and 26 which are joined at each end in conventional manner by the cross members 28 and 30. For lightness, preferably members 24 and 26 are hollow tubes of aluminum. The length of the respective side and cross members of apparatus 22 is such that the attachment fits nicely down over the raised upper portion 32 of the cadriage 6. The height of the side members 24 and 26 is such that when the framework is fitted onto the portion 32, the top surfaces of the side members 24 and 26 are approximately flush with the top surface of the platen 16.

For purposes of description and understanding of the invention, the instant embodiment will be henceforth described as one which is suitable for use with the standard International Business Machine punched card. Therefore, with the standard Apeco machine, two of these cards may be photocopied on the same sheet of photocopy paper because of their size.

Figure 2:
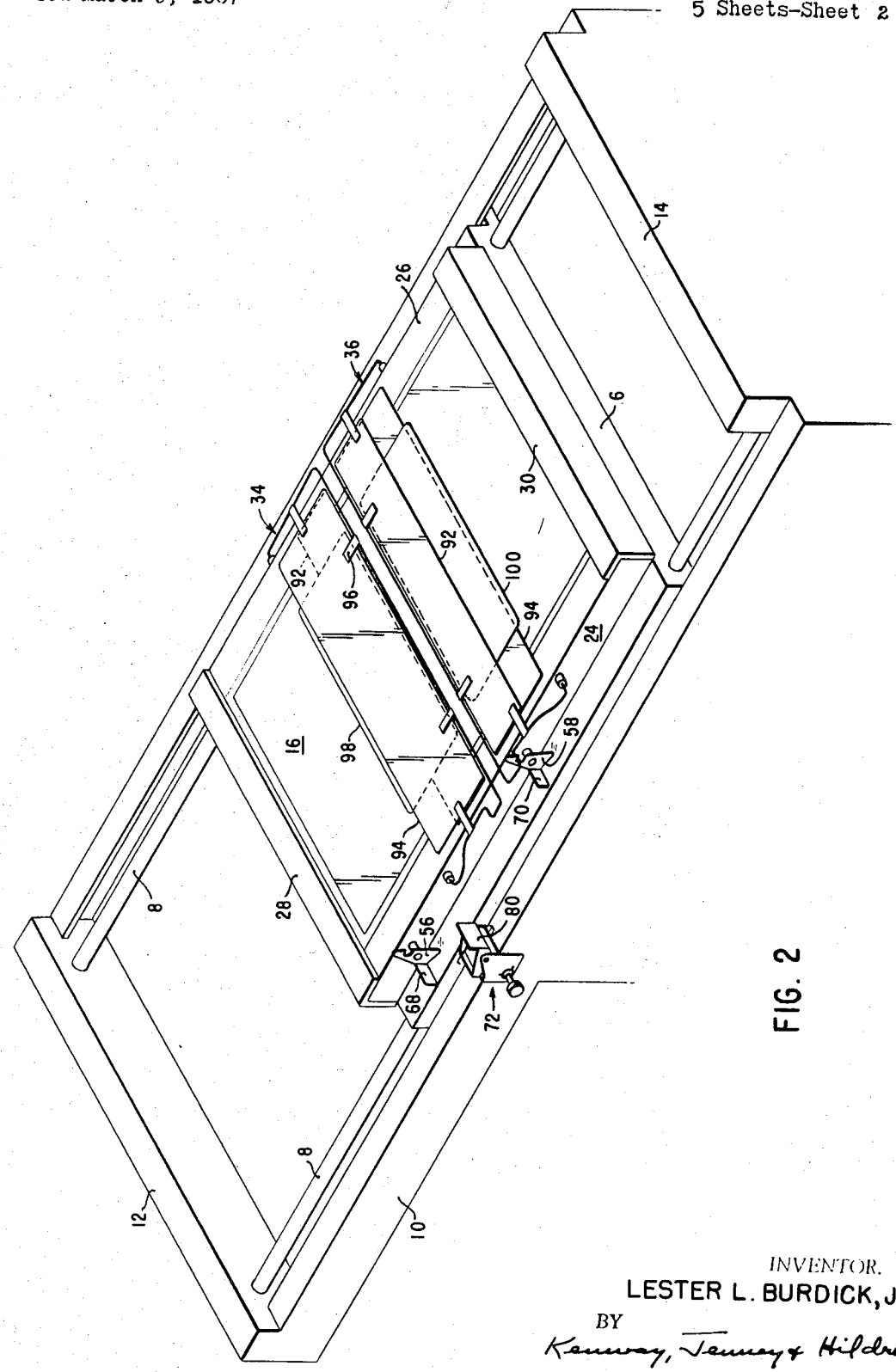
FIG. 2 is another view of the FIG. 1 embodiment, showing the machine in a second position during the operation thereof.

A pair of bails indicated generally by numerals 34 and 36 are provided, the bails being of similar construction. Bail 24 has a bight 38 and the side arms 40 and 42; and bail 36 has a bight 44 and the side arms 46 and 48. Each of side arms 40–48 has its ends turned inwardly, these inwardly turned ends engaging suitable bearing posts 50 mounted on the side arms 24 and 26 near the top surfaces thereof. By this means, the bails 34 and 36 can swing over the top of platen 16 a matter of approximately 180° from the position shown in FIG. 1. In FIG. 2, bail 24 has thus so swung, it being understood that bail 36 can likewise swing. Obviously, the positions of the bearings 50 on the side arms 24 and 26 are such that when the bail 34 swings to the position shown in FIG. 2, it does not overlap the bail 36 when the latter is in its FIG. 1 position. Also, when bail 36 swings to its other position, it will preferably not overlap the end member 30.

Arms 40 and 46 of bails 34 and 36 are bent outwardly with respect to the side arm 24 as shown by numerals 52 and 54, and then again parallel to the side arm before joining the respective bights 38 and 44. The perpendicular portion 52 and 54 of the respective bails provide a means whereby latches 56 and 58 may have their hook portions engages the bails to retain the bails in the positions shown in FIG. 1 until the latches are released. Each of latches 56 and 58 is suitably pivoted so as to turn with respect to the side arm 24 in order either to catch and retain the bails in the FIG. 1 position, or to release the same for swinging over to their second positions.

Each of the bails is biased about its respective pivot points (see FIGS. 3 and 4) by means of a coiled torsion spring 60 and 62, the springs being loosely wound around bearings 50, and having one end 62 engaging a suitably located hole in the frame member 24, and the other end 64 being hooked under the respective bail arm 40 and 46. The direction of winding of the torsion springs 60 is such that both bails are biased in a clockwise direction as viewed in FIG. 1.

In similar manner, that is, by the use of coiled torsion springs 66 which are wound around the pivots 67 of the latches 56 and 58, these latches are biased in a clockwise direction (as the drawings are viewed). Each of latches 56 and 58 have a laterally extending tab 68 and 70 respectively which is located below the axis of the latch pivot, so that when the tabs 68 and 70 are pushed, the effect is to rotate the latches counterclockwise into a bail-releasing position.

Mounted on the side 10 of the machine 4 is an adjusable latch actuator indicated generally by numeral 72, the actuator comprising an H-shaped steel framework whose bottom legs 74 are adapted to slip over and ride on the top of the side 10. A clamp screw 76 is suitably threaded into one of the dependent legs 74 in order to clamp the entire latch in an adjusted predetermined position. Rotatably mounted between the uppers legs 75 of frame 72 by means of pivot pin 84 is a latch structure 78 having a tab 80 which extends upwardly as shown. It will be noticed that pivot 84 is so located that the structure 78 is positioned against the cross-member of the latch holders 72. Thus, the latch tab 80 cannot move in a counterclockwise direction (as viewed in FIG. 4), but is enabled to move in a clockwise direction as so viewed. In order to bias the latch actuator in the counterclockwise direction, a coil spring 86 is wrapped around the pin 84 so that if the tab 80 is moved in a clockwise direction as viewed in FIG. 4, and then released, the torsion spring 86 will move the tab back to the position shown in FIG. 4 automatically.

The length of the extensions 68 and 70 are such as to overlap the latch actuator tab 80 as the carriage 6 is moved along the guide rods 8. When this happens, first the latch 56 is tripped by tab 80 to release the bail 34, and thereafter the latch 58 is tripped by the tab to release the bail 36. On the return stroke of the carriage 6, the tab 80 is permitted to move in a clockwise direction underneath tabs 68 and 70 as viewed in FIG. 4.

Since such a latch mechanism as latches 56 and 58, and the adjustable latch tripper 72 are conventional, no further description will be given here, since the exact details of construction of these latches and their tripping mechanisms are not part of this invention. What is necessary is that when the carriage 6 moves to expose the material on platen 16 to the lens and light source, the latches 56 and 58 are successively tripped to release their respective bails. When the carriage 6 is returned automatically by the mechanism of the photocopier, the latches 56 and 58 are allowed to slide over the latch actuator 72.

Each of the bails 34 and 36 is provided with a transparent holder for the cards which are being copied. Since each of these holders is the same, only one will be described here. A holder indicated generally by numeral 90 comprises a fold of transparent material such as polyethylene or cellophane having the two leaves 92 and 94. The holder is of a length to fit within the arms of its respective bail. Each of the card holders 90 is held to its bail by means of the straps 96, these straps surrounding the bail and lapping over each side of the holder 90, to which they may be permanently attached by suitable adhesive. It will be noted that one of the leaves 92 is narrower than the other leaf 94 in each instance, thus making it easier to insert between the leaves an IBM card illustrated schematically by numeral 98.

Figure 3:
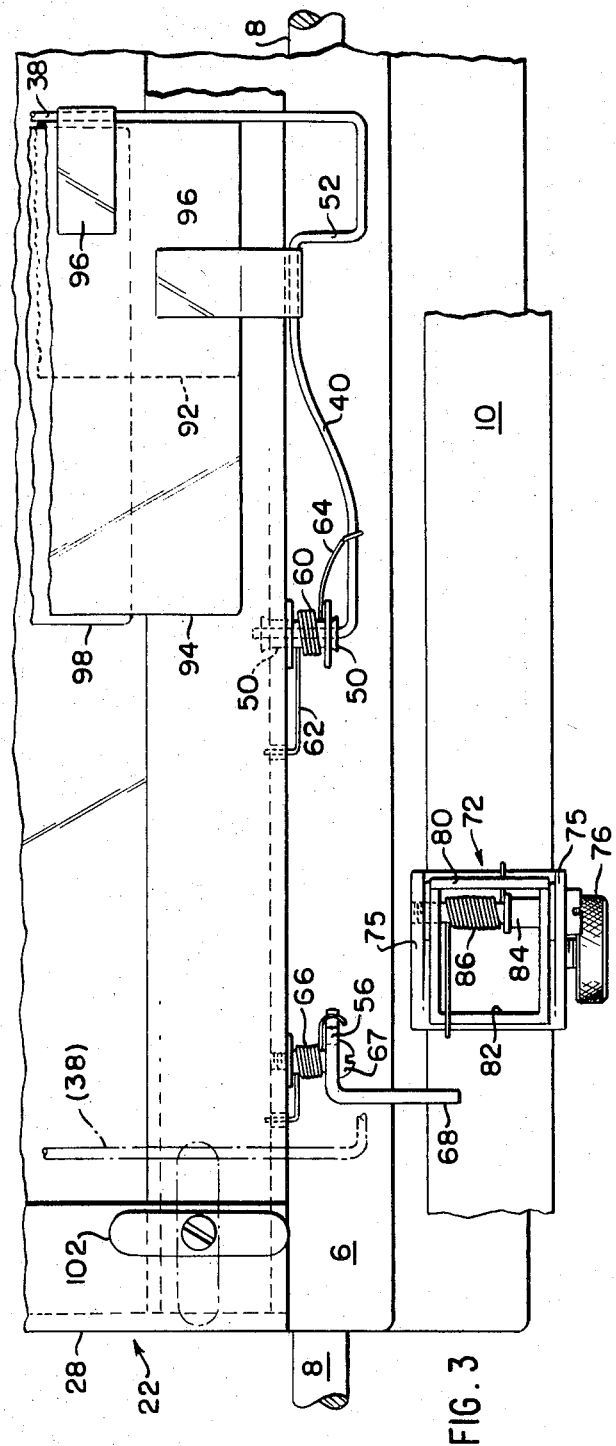
FIG. 3 is an enlarged plan view of a portion of the FIG. 2 drawing.
Figure 4:
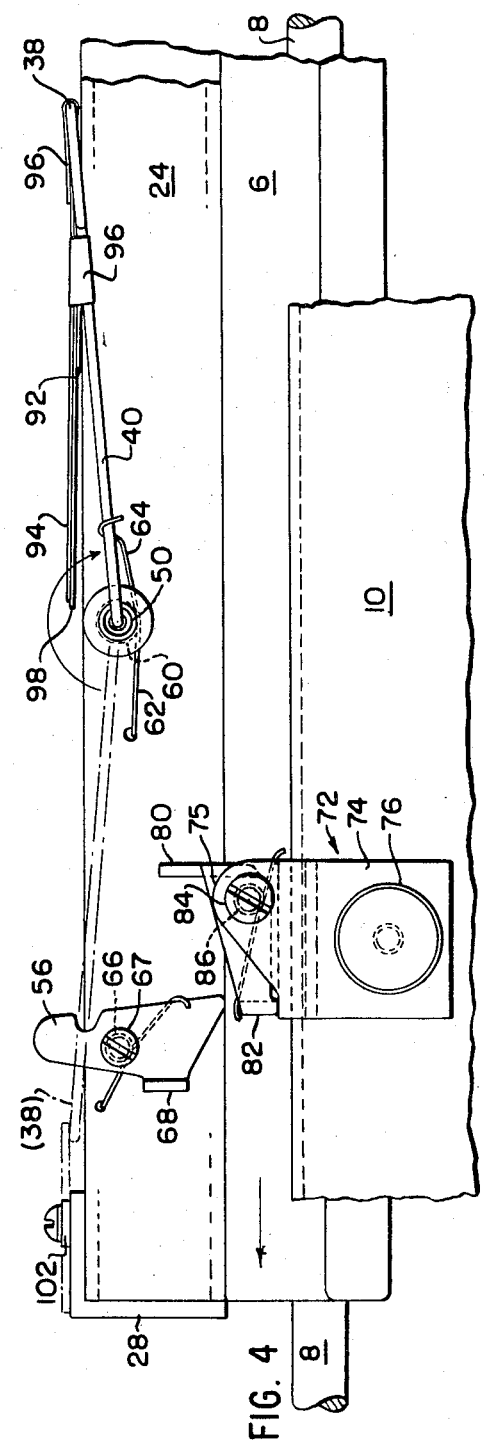
FIG. 4 is an elevation of the FIG. 3 portion.

If desired, a turn button 100 may be mounted on the end member 28, the button being of such length that when turned lengthwise of the machine, it overlaps the bail bight 38. When so engaging the bight, release of the latch 56 will not release the bail. Thus, when it is desired to use the machine with the attachment thereon for copying sheets of material the full length of the platen 16, the bail 36 is first tripped by moving latch 58 so that the bail lies to the right. The turn button 100 is turned to engage the bight 38 of bail 34. The sheet of material to be copied is then inserted in the holder 90 of the bail 34, in which position it will be held against the platen 16. In view of the fact that a portion of the sheet being copies will lie on top of the holder attached to the bail 36 will be of no import, because the latter as indicated above is transparent. Operation of the machine will then make a copy of the entire length of the sheet being held in the holder 90 of bail 34. However, when it is desired to use the machine and its attachment 22 for photocopying both sides of the IBM cards 98, then the turn button 100 is turned to its full line position as shown in FIG. 3, in which position it is not engaging the bail 38.

The operation of the device is as follows:

With the attachment 22 mounted on the machine as shown in FIG. 2, both of the bails 34 and 36 are turned to the position shown in FIG. 1 with their respective latches 56 and 58 engaging the outwardly extending latch portions 52, 54 of the respective bails. In this position, the hook parts of the latches 56 and 58 will engage the bails to hold them in the FIG. 1 position until the latches are released. Meanwhile, the adjustable movable latch tripper 72 has been adjusted to the proper position, which position is determined on the particular machine as being that in which the tab 80 will trip the latch 58 when the machine has photocopied the last line of one surface of IBM cards 98. The IBM cards 98 and 100 are inserted in the respective holders 90, with one surface of each card thus exposed to the light source and lens of the machine, and lying against the platen 16 or approximately thereto. It may be noted that the engagement of the ends of the bails in their pivots 50 is close enough to the surface of the side arms 24 and 26 that as the cards are lying on the platen 16, they are within the field of view of the lens of the machine.

The machine is then started and the carriage 6 moves from right to left as viewed in FIG. 1, carrying with it the attachment 22 and the cards 98, and 100. As the carriage 6 so moves, it traverses the light and lens of the machine, thus photocopying one surface (the down surface) of the card 98. At the point that the edge of the card 98 has been reached in such traversal, the tab 80 trips the latch 56, thus releasing the bail 38 under the bias of its spring 60, and this action will instantly flip the bail 34 to the position shown in FIG. 2. The carriage 6 continues its traverse, and thus the light source and lens will scan the other side of the card 98, thus making a phtotocopy thereof.

Carriage 6 continues to move past the light source and lens of the machine, and thus the first surface of card 100 in bail 36 will be copied. When the light source and lens have reached the last line or bottom edge of the card 100, the latch 58 is then tripped by the tab 80, and the release of bail 36 by the latch 58 permits bail 36 to flip instantly to the right from its position shown in FIGS. 1 and 2 so that it now has brought the other surface of card 100 to bear against the platen 16. The machine 6, meanwhile is steadily traversing and thus the other side of the card 100 is photocopied.

In the particular machine described, the Apeco machine, the carriage 6 now returns automatically to its position shown in FIG. 1. As it does, the latches 56 and 58 are able to override the tab 80 as described above, so that the bails 34 and 36 may be reset to their position as shown in FIG. 1. At this point, the cards 98 and 100 are removed from the respective holders, and new cards are inserted therein and the above operation is repeated.

If one wishes to use a card larger than the particular IBM cards shown which are such size that twice the width of each card equals one-half of the length of the platen 16, then the bail 36 may be tripped to lie to the right as viewed in FIG. 1, thus leaving the platen free. A bail of suitable dimensions is inserted in the pivots 50, which are suitably relocated along arms 24 and 26. The position of these pivot holes will be such that when the bail is rotated with respect to the platen 16, the bottom edge of the particular card as it is being rotated will clear the platen 16. Such holes 104 are indicated, for various size cards.

As thus described, the invention may be an attachment 22 which may be detachably mounted on the carriage 6, or the working parts may be made permanent fixtures on the machine. In the latter case, the attachment 22 will be fastened to the machine by suitably provided machine screws.

Turning now to FIG. 5, a second embodiment is shown, in which the bail carrying attachment 22 is not used. In this instance, the bails 110 and 112 (which are the same as bails 34 and 36 respectively) are mounted by means of suitably provided pivots 114 directly on the upstanding framework 32 which carries the platen 16. The latches 56 and 58 are provided just as in the FIG. 1 embodiment, and the bails 110 and 112 are spring biased, just as the latches 56 and 58 are in the FIG. 1 embodiment. A latch tripper 116 is provided as in the FIG. 1 embodiment and is made adjustably fixable on the side member 10 of the machine by means of the clamping screw 118. In this instance, the latch tripper tab 120 is constructed the same as the latch tripper tab 80, except that the tab has in inwardly extending arm 122 of sufficient length as to be engageable by the side tabs 68 and 70 of the latches 56 and 58. Thus, the difference between this machine and that in FIG. 1 is that the bails 110 and 112 are made a permanent part of the machine, and other parts are correspondingly adjusted to become permanent parts. This embodiment of the invention works exactly the same as does the FIG. 1-4 embodiment.

Referring now to FIG. 6, there is shown a third embodiment of the invention, in which the difference lies in the means used to move the bails. Again, the apparatus is described in the form of an attachment as is the FIG. 1 embodiment, the attachment having the side arms 24 and 26, and the end members 28 and 30, as in the FIG. 1 embodiment. (In this particular illustration, only a portion of the embodiment has been shown, since it is all that is necessary for understanding of the new embodiment in view of what has already been described in respect to the FIGS. 1-4 embodiment.) A bail (only one being shown) is indicated generally by numeral 130 and comprises a pair of side arms 132 and a bight 134. The bail is designed to carry a holder 136 which is made the same as the holders 90 of the FIG. 1 embodiment. In this embodiment, the ends of the arms 132 are fitted into hubs 136 which are suitably provided against the sides of the arms 24 and 26, thus enabling the bails to be swung with respect to the framework, as are the bails in the FIG. 1 embodiment.

Also pivoted by means of a pivot pin 138 against the side of frame member 24 is a rubber-tired wheel or roller 140 comprising a solid core 142 rotatably mounted on the pin 138, and a rubber or other resilient sleeve 144 mounted on the core 142. The wheel 140 is positioned so that its tire bears against the hub 136, with the result that when the wheel 140 is turned, this will swing the bail 130 from one side to the other side. Preferably, the diameters of the hub 136 and wheel 140 are such that only a small rotation of wheel 140 is required to swing the bail its approximate 180° the ratio of diameters may be 2:1 or 3:1, for example.

A table 145 is fastened to the side 10 of the machine by means of the screws 146 in such position that when it is desired that the bail 130 be rotated above the platen, at that point the wheel 140 will strike the top surface 148 of the platform 144. It will be understood that the platform 144 is so constructed that it extends across the carriage 32 so that its surface 148 underlies the path of wheel 140. Of course, if desired, the platform 144 may be made adjustable in conventional manner, for example, just as is the trip mechanism 72 of FIG. 1, by the use of suitable dependent side arms and a clamping screw.

The operation of this embodiment is the same as the previous embodiments, except for the operation of the trip device for the bail 130. In the prior cases, the bails were spring loaded, and their latches were tripped by the latch trippers 72 in each embodiment. In the instant invention, the bails were rotated by a rotary means. As indicated above, the card holders 90 are loaded with the IBM cards, and with the carriage 6 in the position shown in FIG. 1, the bails 130 are lying against the platen 16 of the machine in such position that the machine will copy the bottom surface of each card. The machine is then started and carriage 6 traverses the machine. After the first card has been traversed past the light source and lens, at that point the roller 140 will strike the surface 148 of the table 144 with the result that the roller is rotated, thus turning the hub 136. Turning of the latter will immediately rotate the bail 130 to bring the other side of the card in this bail and its holder to lie against the platen in position to be copied. Subsequently, as the machine continues to traverse, the roller of the second bail will strike the surface 148 of the table 144, and rotate that bail for copying of the other surface of the card being controlled by that bail.

It will be noticed that in this embodiment, the engagement of the wheel 140 with the surface 148 of platform 144 and with the hub 136 is a frictional engagement, and once the wheel 140 has turned sufficiently to bring the bail 130 to lie against the surface of the platen of the machine, then the wheel 140 will slip along the surface 148 until the whole wheel escapes the platform 144. On the return trip, as carriage 6 reverets to its original starting position, the wheel 140 will strike the surface 148, and thus there will be an automatic return of the bails to their position for reloading by the operator.

Instead of the friction roller 140, other rotary means may be used for rotating the bails, such as a rack mounted on the member 10, the rack engaging suitable gearing to control the bails. Furthermore, if desired, each of the bails may be operated by a small motor, the motor to be controlled in turn by suitably placed contacts on the member 10.

The embodiments have been described in terms of applying an attachment for controlling the bails to a machine, or applying the bails directly to the machine, but in both instances, the machine carriage traverse past a light and lens to give the relative motion described above, for scanning purposes. It is the motion of this carriage which carries the material being protographed that is used to control the operation of the bails. There are machines on the market in which the platen carrying the material to be copied is stationary, and instead the light source and the lens move in respect to the stationary material being copied, in order to obtain the scanning. In such machines, the same general mechanisms for actuating the bails may be used, but in that instance, the motion of the scanning light and/or lens would be used to operate the tripper 72 past the bail latches, or to move the table 144 until it strikes the roller 140–142.

In view of the above it will be seen that the several objects of the invention are achieved and other advantageous results attained.

It is to be understood that the invention is not limited in its application to the details of construction, and arrangement of parts illustrated in the accompanying drawings, nor to the methods described, since the invention is capable of other embodiments and of being practiced or carried out in various ways. Also, it is to be understood that the phraseology or terminology employed herein is for the purpose of description and not of limitation.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. In a copying machine including a lens and light source, a transparent platen against which a document having two surfaces is to be placed for copying, and exposure timing means, that improvement which comprises holding means pivotally mounted on the machine for holding said document against the platen in each of first and second positions, in one of which positions one surface of the document is positioned to be copied, and in the other of which positions the other surface of the document is positioned to be copied;

first means operatively connected to the holding means for pivoting the latter with respect to the platen;

second means operatively associated with the machine for automatically actuating said first means to move the document from said first position into said second position immediately after said one surface has been copied, whereby said second surface is then positioned for copying; and timing means whereby said document is moved from said first position to said second position after said one surface of the document has been copied, relative motion occuring between said platen and said lens.

2. In a copying machine including a lens and light source, a transparent platen against which a document having two surfaces is to be placed for copying, and exposure timing means, that improvement which comprises holding means pivotally mounted on the machine for holding said document against the platen in each of first and second positions, in one of which positions one surface of the document is positioned to be copied, and in the other of which positions the other surface of the document is positioned to be copied;

first means operatively connected to the holding means for pivoting the latter with respect to the platen;

second means operatively associated with the machine for automatically actuating said first means to move the document from said first position into said second position immediately after said one surface has been copied, whereby said second surface is then positioned for copying; and relative motion occuring between said platen and said lens, said second means being caused to actuate said first means by said relative motion.

3. In a copying machine including a lens and light source, a transparent platen against which a document having two surfaces is to be placed for copying, and exposure timing means, that improvement which comprises holding means pivotally mounted on the machine for holding said document against the platen in each of first and second positions, in one of which positions one surface of the document is positioned to be copied, and in the other of which positions the other surface of the document is positioned to be copied;

said holding means comprising a U-shaped frame having a bight and a pair of legs, the bight extending across said platen and carrying for movement therewith a carrier for said document, and the ends of the legs being pivotally mounted on the machine whereby said bight and carrier swing in an arc above the platen in going from said first position to said second position;

first means operatively connected to the holding means for pivoting the latter with respect to the platen; and second means operatively associated with the machine for automatically actuating said first means to move the document from said first position into said second position immediately after said one surface has been copied, whereby said second surface is then positioned for copying.

4. The machine of claim 3 in which said holding means are plural, each comprising a said frame, and the frames being so arranged lengthwise along the platen that any given document in either its first or second positions does not overlap an adjacent document.

5. The machine of claim 4 in which said second means actuates a first one of said frames to expose a second surface thereof after the first surface thereof is exposed, and then actuates a succeeding frame to expose a second surface of the latter after the first surface of the latter is exposed.

6. In a copying machine including a lens and light source, a transparent platen against which a document having two surfaces is to be placed for copying, and exposure timing means, that improvement which comprises holding means pivotally mounted on the machine for holding said document against the platen in each of first and second positions, in one of which positions one surface of the document is positioned to be copied, and in the other of which positions the other surface of the document is positioned to be copied;

said holding means being plural in number with each holding means being adapted to hold a document, and the holding means being so arranged lengthwise along the platen that any given document in either its first or second positions does not overlap an adjacent document;

first means operatively connected to each of the holding means for pivoting the latter with respect to the platen; and second means operatively associated with the machine for automatically actuating said first means to move the doucment from said first position into said second position immediately after said one surface has been copied, whereby said second surface is then positioned for copying.

7. In a copying machine including a lens and light source, a transparent platen against which a document having two surfaces is to be placed for copying, and exposure timing means, that improvement which comprises holding means pivotally mounted on the machine for holding said document against the platen in each of first and second positions, in one of which positions one surface of the document is positioned to be copied, and in the other of which positions the other surface of the document is positioned to be copied;

first means operatively connected to the holding means for pivoting the latter with respect to the platen, said first means being a spring operatively biasing said holding means toward said second position; and second means operatively associated with the machine for automatically actuating said first means to move the document from said first position into said second position immediately after said one surface has been copied, whereby said second surface is then positioned for copying, the second means consttiuting a latch restraining said holding in said first position, said latch being releasable to permit said holding means to move to said second position.

8. In a copying machine including a lens and light source, a transparent platen against which a document having two surfaces is to be placed for copying, and exposure timing means, that improvement which comprises holding means pivotally mounted on the machine for holding said document against the platen in each of first and second positions, in one of which positions one surface of the document is positioned to be copied, and in the other of which positions the other surface of the document is positioned to be copied;

first means operatively connected to the holding means for pivoting the latter with respect to the platen, said first means comprising a pinion pivotally mounted on the machine and mounting the holding means, the pinion being turnable to move the holding means into said second position from said first position;

rack means mounted on the machine and adapted to cause rotation of the pinion, the pinion and rack being movable relative to each other; and second means operatively associated with the machine for automatically actuating said first means to move the document from said first position into said second position immediately after said one surface has been copied, whereby said second surface is then positioned for copying.

9. In a copying machine including a lens and light source mounted on a base, a transparent platen against which a document having two surfaces is to be placed for copying, the platen being movable relative to the lens, that improvement which comprises:

a document-holding means comprising a U-shaped framework having a bight and a pair of legs, the bight extending across the platen and carrying for movement therewith a carrier for said document, the ends of said legs being pivotally mounted to the sides of the platen, and the framework being adapted to hold the document against the platen in each of two positions, in one of which positions one surface of the document is positioned to be copied, in the other position the other surface of the document is positioned to be copied;

first means operatively connected to the ends of the legs for pivoting the framework; and second means mounted on the machine for actuating said first means upon motion of the platen relative to the lens, whereby after said one surface of the document is copied, the framework is then pivoted, and said other surface of the document is then positioned for copying.

10. The machine of claim 9 in which said first means is a spring biasing said framework toward said other position, and including a latch for releasably restraining the framework in said one position while the first surface is being exposed, and said second means comprises a trip for said latch.

11. The machine of claim 9 in which said first means is a pinion supporting the end of one of said legs, the pinion being pivoted to the platen, and said second means comprises a rack on the machine in respect to which said platen and pinion are movable whereby, when said platen moves relative to said lens, the pinion is caused to rotate by the rack to pivot said framework from said first position to said second position.

12. An attachment for a copying machine having a transparent platen against which a document having two surfaces is to be placed for copying, comprising:

a rigid framework enclosing an opening and adapted to be positioned on the machine with said opening over the platen;

holding means pivotally mounted on the framework for holding said document against the platen in each of first and second positions, in one of which positions one surface of the document is positioned to be copied, and in the other of which positions the other surface of the document is positioned to be copied;

first means operatively connected to the holding means for pivoting the latter with respect to the platen; and second means operatively associated with the machine for actuating siad first means to move the document from said first position into said second position immediately after said one surface has been copied, whereby said second surface is then positioned for copying.

13. The machine of claim 12 in which relative motion occurs between said framework and said lens, said second means being caused to actuate said first means by said relative motion.

References Cited

UNITED STATES PATENTS

| 1,696,381 | 11/1928 | Caps | 88—24 |
| 1,728,102 | 9/1929 | Caps | 88—24 |
| 3,381,573 | 5/1968 | Caldwell | 84—24 |
| 3,475,094 | 10/1969 | Kucera et al. | 335—23 |

JOHN M. HORAN, Primary Examiner

R. A. WINTERCORN, Assistant Examiner

U.S. Cl. X.R.

198—33; 271—65; 355—75